US005916362A

United States Patent [19]
Takahara et al.

[11] Patent Number: 5,916,362
[45] Date of Patent: Jun. 29, 1999

[54] METHOD FOR PRODUCING CEMENT USING MANGANESE SLAG AS RAW MATERIAL

[75] Inventors: Toshiya Takahara, Kanagawa; Shinji Tokitaka, Yamaguchi, both of Japan

[73] Assignee: Tosoh Corporation, Yamaguchi, Japan

[21] Appl. No.: 08/974,877

[22] Filed: Nov. 20, 1997

[30] Foreign Application Priority Data

Nov. 22, 1996 [JP] Japan .................................... 8-311826

[51] Int. Cl.$^6$ ........................................................ C04B 7/14
[52] U.S. Cl. ........................ 106/767; 106/769; 106/789; 106/782
[58] Field of Search .................................. 106/767, 769, 106/789, 782, 714

[56] References Cited

U.S. PATENT DOCUMENTS

| | | | |
|---|---|---|---|
| 1,462,991 | 7/1923 | Taylor | 106/789 |
| 5,421,880 | 6/1995 | Young | 106/767 |

OTHER PUBLICATIONS

CA 99:75847, Chou Denki Kogyo Co., Ltd., 'Concrete blocks', corresponds to JP 58014395 B4, Mar. 1983.

CA 83:136405, Umemura et al., 'cement product from manganese slag', corresponds to JP 50022020, Mar. 1975.

*Primary Examiner*—Michael Marcheschi
*Attorney, Agent, or Firm*—Sughrue, Mion, Zinn, Macpeak & Seas, PLLC

[57] ABSTRACT

A method for producing cement is disclosed. The method has the advantages that a setting time can be shortened as compared with conventional cement, and a manganese slag can be treated at low cost without giving load to environment, by using the manganese slag which has conventionally been subjected to waste disposal, as a cement raw material. The method comprises using, as a part of cement materials, a manganese slag which is an insoluble component formed in extraction step and refining step in a production of electrolytic manganese dioxide comprising extracting a manganese component from manganese-containing ore, refining a manganese-containing aqueous solution obtained, and conducting electrolytic treatment, to produce manganese dioxide.

5 Claims, No Drawings

METHOD FOR PRODUCING CEMENT USING MANGANESE SLAG AS RAW MATERIAL

FIELD OF THE INVENTION

The present invention relates to a method for producing a cement which uses, as a part of raw materials for cement, manganese slag discharged in extraction step and refining step in producing electrolytic manganese dioxide from manganese-containing ore.

BACKGROUND OF THE INVENTION

Natural manganese dioxide or electrolytic manganese dioxide produced from manganese ore is used as a material for a positive electrode for primary battery such as manganese dry battery or alkali dry battery. Of such batteries, the primary battery using electrolytic manganese dioxide has high performances as compared with a battery using natural manganese dioxide, and therefore, its demand is increasing year by year.

The electrolytic manganese dioxide is generally produced by the following steps.

A raw material ore containing manganese is dried and ground. The resulting particles are dissolved in a sulfuric acid aqueous solution to extract manganese in the sulfuric acid aqueous solution. The manganese-containing sulfuric acid aqueous solution obtained by this extraction step contains solid materials comprising a silcate which is insoluble in sulfuric acid. Therefore, at this stage, a first filtration is conducted to separate the solution into solid materials and an extracting liquid. However, elements such as iron, alkali metals or the like are dissolved in the extracting liquid. Therefore, those elements are subjected to refining step by oxidizing those using an oxidizing agent and neutralizing the oxidized products with lime stone to form those in the form of hydroxides, or in the form of sulfates, thereby precipitating those as solid materials. The extracting liquid thus treated is similarly subjected to a filtration treatment to separate the solid materials from the liquid, thereby obtaining a refined liquid containing manganese sulfate. The refined liquid thus obtained is then supplied to an electrolytic cell equipped with a titanium anode and a graphite cathode. Electrolysis is perfomed by applying current to deposit manganese dioxide on an anode plate. Manganese dioxide thus obtained is separated from the anode plate to obtain a flaky manganese dioxide. This flaky manganese dioxide is then ground and washed with water to obtain electrolytic manganese dioxide.

Solid materials formed in the above manganese extraction step and refining step are called manganese slags, and those manganese slags are all discharged into out-of-system. Those manganese slags are mainly constituted of water, $Fe_2O_3$, $MnSO_4$, $SiO_2$ and $Al_2O_3$. Those manganese slags discharged have conventionally been mixed with slaked lime (calcium hydroxide) for insolubilization treatment. The insolubilized slags have been dealed with disposal by land-fills.

However, with increasing consciousness to environmental problems in recent years, it becomes difficult year by year to secure the disposal land, and disposal by land-fills requires much costs. Therefore, it has strongly been demanded to establish a treatment method of manganese slag, which can treat the slag at low cost without giving load to environment.

SUMMARY OF THE INVENTION

As a result of extensive investigations in view of the above circumstances, it has been found that a cement having advantages that manganese slags can be treated at low cost without giving load to environment and also a setting time is short as compared with that of the conventional cement, can be obtained by using manganese slags as a part of cement raw materials. The present invention has been completed based on this finding.

Accordingly, an object of the present invention is to provide a method for producing a cement having various advantages.

The present invention provides a method for producing a cement which uses, as a part of raw materials thereof, a manganese slag discharged in extraction step and refining step in producing electrolytic manganese dioxide from manganese-containing ore.

In the preferred embodiment of the method, manganese slag which has been subjected to water washing treatment is used.

DETAILED DESCRIPTION OF THE INVENTION

The present invention is described in detail below.

Manganese slag formed in the production step of electrolytic manganese dioxide is separated from an aqueous solution containing manganese sulfate by a filter press or the like in extraction step and refining step, and is then discharged. The manganese slag obtained contains water in an amount of about 40% by weight. Therefore, it is necessary for the manganese slag to be subjected to drying treatment prior to using the same as a cement raw material in laboratory investigation. Specifically, the manganese slag discharged is introduced into an electric furnace or the like and heated at a temperature of about 100 to 120° C., subjecting the slag to the drying treatment until weight loss of the manganese slag does not occur. The drying time is preferably 24 hours or more. Further, manganese in an amount of about 20% by weight in terms of MnO remains in the manganese slag prior to the drying treatment. Therefore, the manganese slag may be subjected to water washing treatment prior to the drying step to remove the residual water-soluble manganese sulfate, and solid-liquid separation may be conducted again by a filter press, followed by subjecting the solid to the drying step. If a step of previously removing manganese compounds in the manganese slag is included, it is possible to use the manganese slag as the cement raw material in a large amount as compared with the case that such a removal is not conducted as described hereinafter, and also it is possible to effectively utilize the manganese slag by returning waste water formed by the water washing treatment to the electrolytic manganese dioxide production step.

The manganese slag after drying step is mechanically ground, and the resulting particles are subjected to classification treatment to form a powder having a particle size of 210 μm or less. Specifically, dried manganese slag is preliminarily ground using a jaw crusher or the like, and the resulting particles are further pulverized using a vibration mill or the like. The powder thus obtained is classified with a vibration sieve device or the like into a powder having a particle size of 210 μm or less. The drying step and grinding step may be conducted simultaneously.

The manganese slag thus obtained is appropriately mixed with lime stone, clay, siliceous sand, copper slag and coal flyash, which have been subjected to the same drying treatment, grinding treatment and classification treatment to classify the same into a powder having a particle size of 210 μm or less, to prepare a mixed raw material for cement production. Of those raw materials, only the manganese slag contains a large amount of manganese. In the production of cement, if the amount of manganese in the mixed raw material is excessively increased, the color of the cement obtained may greatly change, so that it shows bluish purple. Therefore, in mixing the raw materials, it is necessary to control the amount of manganese dioxide used such that the amount of manganese does not exceed 0.5% by weight in terms of MnO.

Therefore, where the manganese slag is used as the cement raw material, if water washing treatment is applied to the manganese slag discharged from the electrolytic manganese dioxide production step, it is possible to use a further large amount of the manganese slag as the cement raw material as compared with the case that the water washing treatment is not applied.

Water is added to the mixed raw material thus obtained in an amount of 20 cc per 100 g of the mixed raw material. A pasty mixture thus obtained is molded into a 10 mm cube. The molded products thus obtained are placed in an electric furnace or the like, and heated at a temperature of about 100 to 120° C. for 24 hours, thereby conducting drying treatment. The dried molded products are further placed in an electric furnace heated to about 1,400 to 1,500° C., and sintered therein for about 90 to 120 minutes. The molded products are taken out of the electric furnace and spontaneously cooled.

Gypsum is added to the molded products thus treated in an amount of 4.0 to 4.5 g per 100 g of the molded products, and the resulting mixture is ground and mixed with a bond mill or the like to prepare a cement.

The present invention is described in more detail by reference to the following examples, but it should be understood that the invention is not construed as being limited thereto.

EXAMPLE 1

1,000 g of manganese slag separated by a filter press in extraction step and refining step in electrolytic manganese dioxide production were placed on a stainless steel pan, and the pan was placed in an electric furnace heated to 105° C. to conduct drying treatment for 48 hours. The amount of the manganese slag obtained after drying was 580 g. Compositions (in terms of oxide) of the manganese slag after drying are shown in Table 1 below.

TABLE 1

| Oxide | Content (wt %) |
| --- | --- |
| $SiO_2$ | 8.9 |
| $Al_2O_3$ | 8.5 |
| $Fe_2O_3$ | 28.5 |
| CaO | 5.1 |
| $SO_3$ | 20.5 |
| $Na_2O$ | 0.6 |
| $K_2O$ | 4.1 |
| MnO | 22.3 |
| Others | 1.5 |

This manganese slag was introduced into a jaw crusher at a rate of 5 kg/minute, and coarsely ground into coarse particles having a particle size of 20 mm or less. The resulting coarse particles were introduced into a brown crucher at a rate of 150 g/min, and ground into particles having an average particle size of 1 to 2 mm and the maximum particle size of 5 mm or less. The manganese slag thus ground was further pulverized using a vibration mill for 1 minute with 60 g portions. The powder thus obtained was classified with JIS mesh sieve having an opening of 210 μm, thereby adjusting the particle size of powder to 210 μm or less. The yield of the powder was 98%.

Lime stone, clay, siliceous sand, copper slag and flyash of coal, which were other cement raw materials, were subjected to the same drying treatment and grinding treatment as in the manganese slag. 1,000 g of water were added to 4,005 g of lime stone, 390 g of clay, 235 g of flyash of coal, 270 g of siliceous sound, 75 g of copper slag and 25 g of manganese slag thus obtained, and the resulting mixture was kneaded for 30 minutes. A paste thus obtained was flattened out at a thickness of 10 mm, and cut into pieces of 10 mm square with a cutter, thereby molding into 10 mm cubes.

The molded products obtained were introduced into a large-size dryer and subjected to a drying treatment at 105° C. for 24 hours. The dried molded products were placed on a platinum-made pan, and the pan was introduced into an electric furnace heated to 1,450° C. to conduct sintering for 90 minutes. The sintered molded products were taken out of the electric furnace, and spontaneously cooled.

2,300 g of the sintered products thus obtained and 100 g of dried gypsum were introduced into a bond mill having a volume of 30 liters, and pulverized at grinding revolutions of 7,500 rpm so as to adjust a specific surface ares to 3,400±100 $cm^2/g$ with a blaine method for 110 minutes to obtain a cement.

The cement obtained had the same color as that of the commercially available common cement. Tests corresponding to JIS standards were conducted to this cement. The results obtained are shown in Table 2 below.

TABLE 2

| Test Item | JIS Standard | Test Result |
| --- | --- | --- |
| Specific surface area with a blaine method ($cm^2/g$) | 2,500 or more | 3,480 |
| Setting (hr-min) | | |
| Initial | 1-00 or more | 2-37 |
| Final | 10-00 or less | 3-37 |
| Soundness | Good | Good |
| Compressive strength* ($N/mm^2$) | | |
| 3 days | 7.0 or more | 17.2 |
| 7 days | 15.0 or more | 28.5 |
| 28 days | 30.0 or more | 48.7 |
| Chemical composition (wt %) | | |
| Ignition loss | 3.0 or less | 1.30 |
| MgO | 5.0 or less | 1.18 |
| $SO_3$ | 3.0 or less | 1.98 |
| $Na_2O$ eq | 0.75 or less | 0.38 |
| Cl | 0.02 or less | 0.002 |

*: Measured according to old JIS method

As is apparent from the above results, the cement obtained has performances satisfying the JIS standards.

EXAMPLE 2

200 g of the manganese slag having the same compositions as in Example 1 were introduced in a 3 liter stanless steel pan, and 2,000 g of water were added thereto. The resulting mixture was stirred using a stirrer for 60 minutes, and then filtered. The same water washing described above was repeated three times, and drying treatment and grinding treatment were conducted in the same manners as in Example 1 to obtain a manganese slag for cement raw materials.

Compositions (in terms of oxide) of the water-washed manganese slag after drying are shown in Table 3 below.

TABLE 3

| Oxide | Content (wt %) |
|---|---|
| $SiO_2$ | 11.5 |
| $Al_2O_3$ | 11.0 |
| $Fe_2O_3$ | 37.0 |
| CaO | 6.6 |
| $SO_3$ | 14.1 |
| $Na_2O$ | 0.7 |
| $K_2O$ | 5.3 |
| MnO | 11.8 |
| Others | 2.0 |

125 g of the manganese slag were blended with 3,990 g of lime stone, 340 g of clay, 230 g of flyash of coal and 315 g of siliceous sand, which had been applied to drying treatment and grinding treatment in the same manners as in Example 1, and also 1,000 g of water, and the resulting mixture was kneaded to prepare a paste. This paste was molded in the same manner as in Example 1 to obtain a 10 mm cube. The molded products thus obtained were dried and sintered in the same manners as in Example 1 to prepare sintered products. 2,300 g of the sintered products thus obtained and 100 g of dried gypsum were introduced into a bond mill having a volume of 30 liters, and pulverized at grinding revolutions of 7,500 rpm so as to adjust a specific surface area to $3,400\pm100$ cm$^2$/g with a blaine method for 110 minutes to obtain a cement.

The cement obtained had the same color as that of the commercially available common cement. Tests corresponding to JIS standards were conducted to this cement. The results obtained are shown in Table 4 below.

TABLE 4

| Test Item | JIS Standard | Test Result |
|---|---|---|
| Specific surface area with a blaine method (cm$^2$/g) | 2,500 or more | 3,410 |
| Setting (hr-min) | | |
| Initial | 1-00 or more | 2-57 |
| Final | 10-00 or less | 4-02 |
| Soundness | Good | Good |
| Compressive strength* (N/mm$^2$) | | |
| 3 days | 7.0 or more | 16.4 |
| 7 days | 15.0 or more | 27.0 |
| 28 days | 30.0 or more | 45.8 |
| Chemical composition (wt %) | | |
| Ignition loss | 3.0 or less | 1.31 |
| MgO | 5.0 or less | 1.16 |
| $SO_3$ | 3.0 or less | 1.98 |
| $Na_2O$ eq | 0.75 or less | 0.35 |
| Cl | 0.02 or less | 0.003 |

*: Measured according to old JIS method.

As is apparent from the above results, the cement obtained has performances satisfying the JIS standards.

COMPARATIVE EXAMPLE 160 g of manganese slag having the same compositions as in Example 1, which had been subjected to the same drying treatment and grinding treatment as in Example 1, but had not been subjected to water washing treatment, were kneaded together with 3,965 g of lime stone, 335 g of clay, 230 g of flyash of coal, and 310 g of siliceous sand, which had been subjected to drying treatment and grinding treatment in the same manners as in Example 2, and also 1,000 g of water to prepare a paste. This paste was molded in the same manner as in Example 1 to prepare 10 mm cubes. The molded products thus obtained were dried and sintered in the same manner as in Example 1 to prepare sintered products. 2,300 g of the sintered products thus obtained and 100 g of dried gypsm were introduced into a bond mill having a volume of 30 liters, and pulverized at grinding revolutions of 7,500 rpm so as to adjust a specific surface area to $3,400\pm100$ cm$^2$/g with a plane for 110 minutes to obtain a cement.

The cement obtained showed bluish purple when visually observed, and thus lost a color as a cement.

EXAMPLE 3

Actual cement kiln was used, and using manganese slag in an amount of 50 t/day a cement was actually produced in a production amount of 4,500 t/day for one month.

Compositions of the manganese slag used are shown in Table 5 below.

TABLE 5

| Oxide | Content (wt %) |
|---|---|
| $SiO_2$ | 8.6 |
| $Al_2O_3$ | 8.2 |
| $Fe_2O_3$ | 24.5 |
| CaO | 10.5 |
| MgO | 0.4 |
| $SO_3$ | 18.2 |
| $Na_2O$ | 0.6 |
| $K_2O$ | 4.1 |
| MnO | 22.5 |
| Others | 2.4 |

Comparison between the cement obtained and a cement not using manganese slag is shown in Table 6 below.

TABLE 6

| Test Item | JIS Standard | Mn slag used | Mn slag not used |
|---|---|---|---|
| Specific surface area with a blaine method (cm$^2$/g) | 2,500 or more | 3,260 | 3,230 |
| Setting (hr-min) | | | |
| Initial | 1-00 or more | 2-28 | 2-40 |
| Final | 10-00 or less | 3-20 | 3-42 |
| Soundness | Good | Good | Good |
| Compressive strength* (N/mm$^2$) | | | |
| 3 days | 7.0 or more | 17.0 | 16.4 |
| 7 days | 15.0 or more | 27.8 | 26.8 |
| 28 days | 30.0 or inore | 43.2 | 43.4 |
| Chemical composition (wt %) | | | |
| Ignition loss | 3.0 or less | 1.53 | 1.44 |
| MgO | 5.0 or less | 1.56 | 1.60 |
| $SO_3$ | 3.0 or less | 1.93 | 1.93 |
| $Na_2O$ eq | 0.75 or less | 0.56 | 0.54 |
| Cl | 0.02 or less | 0.003 | 0.003 |

*: Measured according to old JIS method.

When a setting time is compared between the cement obtained and a cement which does not use manganese slag, the setting time of the cement using manganese slag is 3 hours and 20 minutes, whereas that of the cement not using manganese slag is 3 hours and 42 minutes. Thus, the setting time of the cement using manganese slag is 20 minutes shorter than that of the cement not using manganese slag. This provides a great effect to cost reduction in construction using a cement.

As described above, the present invention uses manganese slag discharged in producing electrolytic manganese dioxide, as a cement raw material. Such a cement has the advantages that a setting time of the cement can be shortened, and it is expected to decrease cost for construction using a cement. Further, there are the advantages that treatment cost of manganese slag can be decreased, and also load to environment can be decreased. Thus, the cement according to the present invention has high industrial value.

While the invention has been described in detail and with reference to specific embodiments thereof, it will be apparent to one skilled in the art that various changes and modifications can be made therein without departing from the spirit and scope thereof.

What is claimed is:

1. A method for producing a cement, which comprises mixing cement materials and manganese slag, wherein said manganese slag is an insoluble component formed in an extraction step and a refining step in a process for the production of electrolytic manganese dioxide, which process comprises extracting a manganese component from a manganese-containing ore, refining a manganese-containing aqueous solution obtained, and conducting electrolytic treatment to produce manganese dioxide, wherein the manganese slag is separated from a refined liquid manganese sulfate-containing aqueous solution and the manganese slag so separated contains water, which the manganese slag contains manganese in an amount of about 20% by weight in terms of MnO prior to drying.

2. The method as claimed in claim 1, wherein said manganese slag is subjected to water washing treatment.

3. The method as claimed in claim 1 or claim 2, wherein said so separated manganese slag is treated by a process which comprises drying, mechanical grinding, pulverizing and classifying into a powder having a particle size of 210 $\mu$m or less.

4. The method as claimed in claim 1 or claim 2, wherein said so separated manganese slag is in powder form and is treated by a process which comprises molding the powder into a cube molded product, whereafter gypsum is added to the cube molded product in amount of 4.0 to 4.5 g per 100 g of the molded product.

5. The method as claimed in claim 3, wherein said powder of the manganese slag is treated by a process which comprises molding the powder into a cube molded product, whereafter gypsum is added to the cube molded product in an amount of 4.0 to 4.5 g per 100 g of the cube molded product.

* * * * *